United States Patent [19]
Webber

[11] Patent Number: 5,229,227
[45] Date of Patent: Jul. 20, 1993

[54] LOW FLAMMABILITY NONAQUEOUS ELECTROLYTES

[75] Inventor: Andrew Webber, Avon Lake, Ohio

[73] Assignee: Eveready Battery Company Inc., St. Louis, Mo.

[21] Appl. No.: 919,406

[22] Filed: Jul. 23, 1992

[51] Int. Cl.$^5$ .............................................. H01M 6/14
[52] U.S. Cl. ..................................... 429/197; 429/218
[58] Field of Search ................ 429/194, 196, 197, 218

[56] References Cited

U.S. PATENT DOCUMENTS

| | | | |
|---|---|---|---|
| 3,546,022 | 12/1970 | Bush et al. | 136/100 |
| 3,796,604 | 3/1974 | Dabomo et al. | 136/6 LN |
| 3,796,605 | 3/1974 | Dechenaux et al. | 136/6 LN |
| 3,915,743 | 10/1975 | Lauck | 136/6 LN |
| 3,928,067 | 12/1975 | Broadhead et al. | 136/6 LN |
| 3,996,069 | 12/1976 | Kronenberg | 429/197 |
| 4,301,220 | 11/1981 | Evans et al. | 429/197 |
| 4,526,846 | 7/1985 | Kearney et al. | 429/194 |
| 5,051,325 | 9/1991 | Shishikura et al. | 429/197 |
| 5,154,992 | 10/1992 | Berberick et al. | 429/197 |

OTHER PUBLICATIONS

"The Behaviour of Lithium Batteries in a Fire" by A. Attewell—Journal of Power Sources; 26(1989) 195:200.

*Primary Examiner*—Anthony Skapars
*Attorney, Agent, or Firm*—Robert W. Welsh

[57] ABSTRACT

A low flammability nonaqueous electrolyte for use in electrochemical cells in which the electrolyte comprises a solute, such as $LiCF_3SO_3$, dissolved in a mixture of 3-methyl-2-oxazolidone and at least one polyalkylene glycol ether, such as diglyme, and when said electrolyte in use in a lithium cell employing a cathode, such as $FeS_2$, the cell will have good high rate performance even after being stored at high temperatures for prolonged periods of time.

20 Claims, No Drawings

LOW FLAMMABILITY NONAQUEOUS ELECTROLYTES

FIELD OF THE INVENTION

The invention relates to a low flammability nonaqueous electrolyte solution for use in electrochemical cells in which said electrolyte solution comprises a solute dissolved in a 3-methyl-2-oxazolidone and polyalkylene glycol ether solvent mixture where said polyalkylene glycol ether has the formula: $R\text{—}O(\text{—}CH_2\text{—}CH_2\text{—}O)\text{-}_n\text{—}R^1$ where n is greater than one and R and $R^1$ are $C_1\text{-}C_4$ alkyl groups.

BACKGROUND OF THE INVENTION

The development of high energy battery systems requires the compatibility of an electrolyte possessing desirable electrochemical properties with highly reactive anode materials, such as lithium, sodium and the like, and the efficient use of high energy density cathode materials, such as $FeS_2$ and the like. The use of aqueous electrolytes is precluded in these systems since the anode materials are sufficiently active to react with water chemically. It has, therefore, been necessary, in order to realize the high energy density obtainable through use of these highly reactive anodes and high energy density cathodes, to turn to the investigation of nonaqueous electrolyte systems and more particularly to nonaqueous organic electrolyte systems.

The term "nonaqueous organic electrolyte" in the prior art refers to an electrolyte which is composed of a solute, for example, a salt or a complex salt of Group I-A, Group II-A or Group III-A elements of the Periodic Table, dissolved in an appropriate nonaqueous organic solvent. Conventional solvents include propylene carbonate, 1,2-dimethoxyethane (DME), tetrahydrofuran, ethylene carbonate, 3-methyl-2-oxazolidone (3Me2Ox), 3,5-dimethylisoxazole (DMI) or the like. A multitude of solutes is known and recommended for use but the selection of a suitable solvent has been particularly troublesome, since many of those solvents which are used to prepare electrolytes sufficiently conductive to permit effective ion migration through the solution are reactive with the highly reactive anodes described above. Most investigators in this area, in search of suitable solvents, have concentrated on aliphatic and aromatic nitrogen- and oxygen-containing compounds. The results of this search have not been entirely satisfactory since many of the solvents investigated still could not be used effectively with extremely high energy density cathode materials and were sufficiently corrosive to lithium anodes to prevent efficient performance over any length of time. However, many solvents have been found that are suitable for use with high energy density cathode materials.

U.S. Pat. No. 4,753,859 discloses a nonaqueous lithium cell that utilizes an electrolyte that contains such substances as ethylene carbonate, propylene carbonate and one or more polyethylene glycol dialkyl ethers. U.S. Pat. No. 3,796,604 and U.S. Pat. No. 3,796,605 discloses a lithium base electrochemical generator that utilizes a solvent for the electrolyte that comprises a mixture of tetrahydrofuran and dimethoxyethane or a mixture of tetrahydrofuran and diethylene glycol dimethyl ether.

U.S. Pat. No. 3,915,743 discloses a cell having a negative lithium electrode and an organic electrolyte comprising boron trifluoride and a mixture of an alkyl carbonate and an ether such as dimethyl carbonate and 1,2-dimethoxyethane.

U S. Pat. No. 3,546,022 discloses a cell employing a sodium anode and a liquid electrolyte comprising a solution of alkali metal hexafluorophosphate in a dialkyl ether of an alkylene glycol where the alkyl contains 1 to 4 carbon atoms and the alkylene is selected from the group consisting of diethylene, ethylene, dimethylene and trimethylene.

U.S. Pat. No. 3,928,067 discloses a lithium battery that utilizes an electrolyte comprising a solvent such as propylene carbonate, butyrolactone, ethylene carbonate, dimethylsulfite, acetonitrile and dimethylsulfoxide along with a dopant such as a polyalkylene glycol ether.

U.S Pat. No. 3,996,069 discloses a nonaqueous cell utilizing a highly active metal anode, such as lithium, a solid cathode selected from the group consisting of $FeS_2$, $Co_3O_4$, $V_2O_5$, $Pb_3O_4$, $In_2S_3$ and $CoS_2$, and a liquid organic electrolyte consisting essentially of 3-methyl-2-oxazolidone in combination with a low viscosity cosolvent, such as dioxolane, and a metal salt selected, for example, from the group consisting of MSCN, $MCF_3SO_3$, $MBF_4$, $MClO_4$ and $MM'F_6$ wherein M is lithium, sodium or potassium and M' is phosphorus, arsenic or antimony.

While the theoretical energy, i.e., the electrical energy potentially available from a selected anode-cathode couple, is relatively easy to calculate, there is a need to choose a nonaqueous electrolyte for such couple that permits the actual energy produced by an assembled battery to approach the theoretical energy. The problem usually encountered is that it is practically impossible to predict in advance how well, if at all, a nonaqueous electrolyte will function with a selected couple. Thus a cell must be considered as a unit having three parts—a cathode, an anode and an electrolyte —and it is to be understood that the parts of one cell are not predictably interchangeable with parts of another cell to produce an efficient and workable cell.

In an article titled "The Behaviour Of Lithium Batteries In A Fire" by A. Attewell (Journal of Power Sources, 26 (1989) Pg. 195-200) it concludes that "Under warehouse conditions, the major contributor to a lithium battery fire is, when Present, the flammable electrolyte. Lithium metal itself makes only a minor contribution." Consequently, in many applications a low flammability electrolyte would be desirable for cells using a lithium anode. The electrolyte generally chosen for a lithium cell often represents a compromise in that the advantage of a low flammability electrolyte generally is offset by Poorer performance of the cell in some other area, such as high rate performance, particularly at a low temperatures. In devices such as flash cameras, high rate capability is required and therefore if a cell has poor high rate performance, the cell will not be suitable for use in this type of application.

It is an object of the present invention to provide a low flammability electrolyte solution for use in an electrochemical cell that can be stored at high temperatures for extended periods of time without the cell impedance increasing to levels which substantially reduce cell performance.

Another object of the present invention is to provide a low flammability electrolyte solution for an electrochemical cell employing a mixture of 3-methyl-2-oxazolidone (3Me2Ox) and at least one polyalkylene glycol ether having the formula:

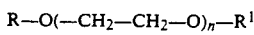

where R and $R^1$ are $C_1$–$C_4$ alkyl groups and n is greater than one.

Another object of the present invention is to provide a low flammability electrolyte solution that is ideally suited for cells employing a lithium anode and an iron sulfide-containing cathode.

The foregoing and additional object will become more fully apparent from the following description.

SUMMARY OF INVENTION

The invention relates to an organic low flammability solution for use in an electrochemical cell comprising a solute dissolved in a solvent mixture of 3-methyl-2-oxazolidone and at least one polyalkylene glycol ether wherein said polyalkylene glycol ether solvent has the formula:

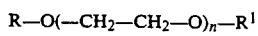

where R and $R^1$ are $C_1$–$C_4$ alkyl groups and n is greater than one.

Liquid 3-methyl-2-oxazolidone,

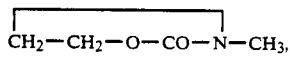

is an excellent nonaqueous solvent because of its high dielectric constant, chemical inertness to battery components, wide liquid range and low toxicity. This solvent has been used in many conventional electrolytes for use in electrochemical cells. However, in seeking a low flammability electrolyte, one would not generally use 3Me2Ox as the sole solvent for the electrolyte because of its undesirably high viscosity. On the other hand, polyalkylene glycol ethers appear to be good candidates for a component for a low flammability electrolyte. In the use of a polyalkylene glycol ether along with a cosolvent, such as propylene carbonate which has a flash point of 132° C., as components for an electrolyte for a lithium cell, the cell performance at 20° C. was found to be good. However, when the cell is stored at 60° C. for a period of at least 14 days, the impedance of the cell will increase thereby adversely affecting the high rate capability of the cell. As stated above, the advantages of employing a low flammability electrolyte in a lithium cell will probably be offset by poorer performance in at least one other area, such as high rate performance. Unexpectedly, it was found that the use of 3Me2Ox along with specific polyalkylene glycol ethers not only can provide a low flammability electrolyte but also provides an electrolyte that enables the cell to retain good stability and high rate performance even after high temperature storage.

The preferred polyalkylene glycol ethers for use in the electrolyte of this invention are diglyme, triglyme, tetraglyme and ethyl diglyme with diglyme (DG) being the most preferred. The preferred volume ratio of the 3Me2Ox to the polyalkylene glycol ether is between 1 to 99 and 75 to 25 with a range between 5 to 95 and 50 to 50 being more preferable and a ratio of about 30 to 70 being most preferred. As seen from these ranges, at least about 25 volume percent of the 3Me2Ox and DG mixture should be DG.

For some applications, at least one optional co-solvent may be used such as 3,5-dimethylisoxazole (DMI), ethylene glycol sulfite (EGS), dimethyl sulfate (DMS), sulfolane or the like. The preferred co-solvent for use in this invention is 3,5-dimethylisoxazole. For most applications the addition of the optional co-solvent should be limited to 15 volume percent or less based on the total volume of the solvent for the electrolyte and preferably less than 5 volume percent.

Highly active metal anodes suitable for this invention include lithium (Li), sodium (Na), potassium (K), calcium (Ca), magnesium (Mg) and their alloys and metal-intercalated carbon or graphite material such as lithiated carbon. Of these active metals, lithium would be preferred because, in addition to being a ductile, soft metal that can easily be assembled into a cell, it Possesses the highest energy-to-weight ratio among the group of suitable anode materials.

Cathodes for use in this invention are solid electrodes which include fluorinated carbon represented by the formula $(CF_x)_n$ wherein x varies between about 0.5 and about 1.2 and $(C_2F)_n$ wherein in both cathodes the n refers to the number of monomer units which can vary widely, copper sulfide (CuS), copper oxide (CuO), lead dioxide ($PbO_2$), iron sulfides (FeS, $FeS_2$), copper chloride ($CuCl_2$), silver chloride (AgCl), sulfur (S), bismuth trioxide ($Bi_2O_3$), copper bismuth oxide ($CuBi_2O_4$), cobalt oxides, vanadium pentoxide ($V_2O_5$), tungsten trioxide ($WO_3$), molybdenum trioxide ($MoO_3$), molybdenum disulfide ($MoS_2$), titanium disulfide ($TiS_2$), transition metal polysulfides, lithiated metal oxides and sulfides, such as lithiated cobalt and/or nickel oxides, lithiated manganese oxides, $Li_xTiS_2$ and $Li_xFeS_2$ and the like.

The preferred cathodes for use in this invention are the iron sulfides alone and in combination with other cathode materials such as:

$FeS_2+CuO$
$FeS_2+Bi_2O_3$
$FeS_2+Pb_2Bi_2O_5$
$FeS_2+Pb_3O_4$
$FeS_2+CuO+Bi_2O_3$
$FeS_2+CuO+Pb_3O_4$
$FeS_2+CuO+CoS_2$
$FeS_2+MnO_2$
$FeS_2+CoS_2$ the most preferred cathode for use in this invention is pyrite ($FeS_2$).

The ionizable solute for use in this invention may be a simple salt such as $LiCF_3SO_3$, $Li(CF_3SO_2)_3C$, $Li(CF_3SO_2)_2CH$, lithium bistrifluoromethylsulfonyl imide ($Li(CF_3SO_2)_2N$), a lithium halide or a double salt or mixtures thereof which will produce an ionically conductive solution when dissolved in these solvents. Suitable solutes are complexes of inorganic or organic Lewis acids and inorganic ionizable salts. One of the requirements for utility is that the salts, whether simple or complex, be compatible with the solvent(s) being employed and that they yield a solution which is sufficiently ionically conductive, e.g., at least about $10^{-4}$ $ohm^{-1} cm^{-1}$ at 25° C. Generally, an amount of at least about 0.5 M (moles/liter) would be required for most cell applications.

Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

The ionizable solute for use in conjunction with iron sulfide-containing cathodes would be lithium trifluoromethane sulfonate (LiCF$_3$SO$_3$), lithium bistrifluoromethylsulfonyl imide (Li(CF$_3$SO$_2$)$_2$N), lithium perchlorate (LiClO$_4$), or mixtures thereof with lithium trifluoromethane sulfonate being the most preferred. Suitable double salts for various cell applications would be lithium tetrafluoroborate (LiBF$_4$), lithium hexafluorophosphate (LiPF$_6$), lithium hexafluoroarsenate (LiAsF$_6$) and Potassium hexafluoroarsenate (KAsF$_6$).

EXAMPLE

Several cells were produced each containing an anode of 0.95 gram of lithium foil, a cathode of about 4 grams of a mix containing approximately 91 weight percent FeS$_2$, 2.5 weight percent acetylene black, 2.25 weight percent graphite, 2.5 weight percent binder, and 1.75 weight percent metallic zinc cast onto a aluminum foil carrier; and about 2.2 grams of an electrolyte as shown in Table 1. A microporous polyethylene separator was used. For Lots A-D, the cathode contact was nickel-plated steel, while for Lot E, the cathode contact was stainless steel.

TABLE 1

ELECTROLYTE SOLUTION

| LOT NO. | DG (vol/%) | 3Me$_2$O$_x$ (vol/%) | PC (vol/%) | LiCF$_3$SO$_3$ (moles/ liter of solvent) |
| --- | --- | --- | --- | --- |
| A | 50 | 50 | 0 | 1 |
| B | 70 | 30 | 0 | 1 |
| C | 90 | 10 | 0 | 1 |
| D | 95 | 5 | 0 | 1 |
| E | 95 | 0 | 5 | 1 |

Batches of the cells (4 or 5 cells per lot) were stored for various periods at 60° C. as shown in Table 2 through Table 6. After storage, the cells were checked for 1 KHz impedance, open circuit voltage (OCV), closed circuit voltage across a 3.9-ohm load (CCV), and flash amperages of the cells were measured. The flash amperage test consisted of a 200-millisecond closed circuit voltage on a 0.01-ohm load.

The average data obtained from the various tests of these cells are shown in Table 2 through Table 6.

TABLE 2

Lot No. A

| 60° C. Storage (weeks) | 1 KHz Impedance (ohms) | OCV (Volts) | CCV (Volts) | Flash Amperage (Amperes) |
| --- | --- | --- | --- | --- |
| 0 | 0.42 | 1.78 | 1.42 | 5.2 |
| 1 | 0.41 | 1.84 | 1.35 | 3.5 |
| 2 | 0.52 | 1.85 | 1.30 | 3.3 |
| 3 | 0.54 | 1.85 | 1.27 | 3.2 |
| 6 | 0.59 | 1.86 | 1.23 | 2.5 |
| 9 | 0.55 | 1.86 | 1.25 | 2.4 |
| 12 | 0.58 | 1.86 | 1.23 | 2.2 |

TABLE 3

Lot No. B

| 60° C. Storage (Weeks) | 1 KHz Impedance (Ohms) | OCV (Volts) | CCV (Volts) | Flash Amperage (Amperes) |
| --- | --- | --- | --- | --- |
| 0 | 0.44 | 1.79 | 1.44 | 5.0 |
| 1 | 0.53 | 1.85 | 1.34 | 3.2 |
| 2 | 0.55 | 1.85 | 1.28 | 3.1 |
| 3 | 0.60 | 1.85 | 1.24 | 3.1 |
| 6 | 0.62 | 1.86 | 1.25 | 3.2 |
| 9 | 0.55 | 1.86 | 1.26 | 2.5 |
| 12 | 0.57 | 1.86 | 1.25 | 2.3 |

TABLE 4

Lot No. C

| 60° C. Storage (Weeks) | 1 KHz Impedance (Ohms) | OCV (Volts) | CCV (Volts) | Flash Amperage (Amperes) |
| --- | --- | --- | --- | --- |
| 0 | 0.47 | 1.78 | 1.43 | 4.8 |
| 1 | 0.66 | 1.85 | 1.32 | 4.1 |
| 2 | 0.64 | 1.85 | 1.23 | 3.7 |
| 3 | 0.74 | 1.85 | 1.20 | 3.5 |
| 6 | 0.72 | 1.86 | 1.23 | 2.9 |
| 9 | 0.65 | 1.86 | 1.26 | 2.6 |
| 12 | 0.68 | 1.86 | 1.23 | 2.1 |

TABLE 5

Lot No. D

| 60° C. Storage (Weeks) | 1 KHz Impedance (Ohms) | OCV (Volts) | CCV (Volts) | Flash Amperage (Amperes) |
| --- | --- | --- | --- | --- |
| 0 | 0.42 | 1.74 | 1.41 | 4.8 |
| 1 | 0.57 | 1.82 | 1.37 | 3.7 |
| 2 | 0.63 | 1.83 | 1.29 | 3.6 |
| 3 | 0.67 | 1.84 | 1.31 | 3.7 |
| 6 | 0.71 | 1.84 | 1.28 | 3.5 |
| 9 | 0.71 | 1.84 | 1.28 | 2.5 |
| 12 | 0.73 | 1.84 | 1.29 | 2.3 |

TABLE 6

Lot No. E

| 60° C. Storage (Weeks) | 1 KHz Impedance (Ohms) | OCV (Volts) | CCV (Volts) | Flash Amperage (Amperes) |
| --- | --- | --- | --- | --- |
| 0 | 0.97 | 1.78 | 1.16 | 1.7 |
| 1 | 1.35 | 1.96 | 1.22 | 1.4 |
| 2 | 1.09 | 1.98 | 1.17 | 1.4 |
| 3 | 1.14 | 1.96 | 1.15 | 1.3 |
| 6 | 1.41 | 1.99 | 1.12 | 1.1 |
| 9 | 1.23 | 1.96 | 1.09 | 1.0 |
| 12 | 1.44 | 1.87 | 1.03 | 1.0 |

The data show an unexpectedly good impedance and flash amperage maintenance for a low flammability electrolyte employing 3Me2Ox and DG. In the sample cells in Lot No. E employing DG along with PC in the electrolyte, the average flash amperage was decreased to 1.0 ampere after the cells were stored at 60° C. for 12 weeks. Contrary to this, all the cells employing 3Me-2Ox along with DG in the electrolyte had an average flash amperage above 2.0 amperes. In the cells in Lot No. E, the electrolyte was 95 vol/% DG and 5 vol/% PC and the average flash amperage was 1.4 with an average impedance of 1.0 ohm while in the cells in Lot No. D, the electrolyte was 95 vol/% DG and 5 vol/% 3Me2Ox and the average flash amperage was 2.3 amperes with an average impedance of only 0.7 ohm. Thus, although PC has a high flash point and would be considered a good cosolvent for DG as the solution for a low flammability electrolyte, the data show that after being stored at 60° C. for 12 weeks, the cells employing this electrolyte did not have an acceptable high rate performance based on the impedance and flash amperage measurements Unexpectedly, the data for cells employing the 3Me2Ox and DG electrolyte show good high rate performance based on the impedance and flash amperage measurements. Thus the low flammability electrolyte of this invention can function in a cell at a high rate even after being stored at high temperature for an extended period of time.

Similar type cells (Lot F) were made except that the cathode mix contained approximately 92.75 weight percent FeS₂, 2.5 weight percent acetylene black, 2.25 weight percent graphite and 2.5 weight percent binder. A microporous polypropylene separator and a nickel-plated steel cathode contact were used. The electrolyte was a 5:95 volume ratio of 3Me2Ox:diglyme containing 1 mole LiCF₃SO₃ per liter of solvent. These cells exhibited high flash amperage and very low impedance after 12-week storage at 60° C.

TABLE 7

| 60° C. Storage (Weeks) | Lot No. F | | | |
|---|---|---|---|---|
| | 1 KHz Impedance (Ohms) | OCV (Volts) | CCV (Volts) | Flash Amperage (Amperes) |
| 0 | 0.36 | 1.78 | 1.48 | 6.6 |
| 1 | 0.43 | 1.86 | 1.45 | 5.1 |
| 2 | 0.44 | 1.86 | 1.40 | 5.7 |
| 3 | 0.38 | 1.85 | 1.36 | 6.1 |
| 6 | 0.38 | 1.86 | 1.42 | 6.1 |
| 9 | 0.35 | 1.86 | 1.38 | 6.7 |
| 12 | 0.37 | 1.85 | 1.44 | 5.9 |

While the present invention has been described with reference to many particular details thereof, it is not intended that these details shall be construed as limiting the scope of this invention.

What is claimed:

1. An organic electrolyte solution for use in an electrochemical cell comprising a solute dissolved in a mixture of 3-methyl-2-oxazolidone and at least one polyalkylene glycol ether and wherein said polyalkylene glycol ether solvent has the formula:

$$R-O(-CH_2-CH_2-O)_n-R^1$$

where R and R¹ and C₁–C₄ alkyl groups and n is greater than one.

2. The organic electrolyte solution of claim 1 wherein the polyalkylene glycol ether is selected from the group consisting of diglyme, triglyme, tetraglyme, and ethyl diglyme.

3. The organic electrolyte solution of claim 1 wherein the polyalkylene glycol ether is diglyme.

4. The organic electrolyte solution of claim 1 wherein the volume ratio of the 3-methyl-2-oxazolidone to the polyalkylene glycol ether is between 1 to 99 and 75 to 25.

5. The organic electrolyte solution of claim 4 wherein the volume ratio of the 3-methyl-2-oxazolidone to the polyalkylene glycol ether is between 5 to 95 and 50 to 50.

6. The organic electrolyte solution of claim 5 wherein the volume ratio of the 3-methyl-2-oxazolidone to the polyalkylene glycol ether is about 30 to 70.

7. The organic electrolyte solution of claim 6 wherein the polyalkylene glycol ether is diglyme.

8. The organic electrolyte solution of claim 1 wherein at least one co-solvent is included in the electrolyte solution.

9. The organic electrolyte solution of claim 1 wherein the solute is selected from the group consisting of lithium trifluoromethane sulfonate, lithium bistrifluoromethylsulfonyl imide, lithium perchlorate, lithium hexafluoroarsenate, lithium halide and mixtures thereof.

10. The organic electrolyte solution of claim 9 wherein the solute is lithium trifluoromethane sulfonate.

11. An electrochemical cell comprising an anode, a cathode and the organic electrolyte solution of claim 1.

12. The electrochemical cell of claim 11 wherein the anode is lithium and the cathode is selected from the group consisting of fluorinated carbon, a metal sulfide, a metal oxide, a lithiated metal oxide, a lithiated metal sulfide, a metal chloride and mixtures thereof.

13. The electrochemical cell of claim 11 wherein the anode is lithium and the cathode is FeS₂.

14. The electrochemical cell of claim 11 wherein the polyalkylene glycol ether is selected from the group consisting of diglyme, triglyme, tetraglyme and ethyl diglyme.

15. The electrochemical cell of claim 14 wherein the polyalkylene glycol ether is diglyme and the anode is lithium.

16. The electrochemical cell of claim 14 wherein the volume ratio of the 3-methyl-2-oxazolidone to the polyalkylene glycol ether is between 1 to 99 and 75 to 25.

17. The electrochemical cell of claim 16 wherein the volume ratio of the 3-methyl-2-oxazolidone to the polyalkylene glycol ether is between 5 to 95 and 50 to 50.

18. The electrochemical cell of claim 17 wherein the volume ratio of the 3-methyl-2-oxazolidone to the polyalkylene glycol ether is about 30 to 70.

19. The electrochemical cell of claim 18 wherein the anode is lithium, the cathode is FeS₂ and the polyalkylene glycol ether is diglyme.

20. The electrochemical cell of claim 18 wherein the anode is lithium, the cathode is MnO₂ and the polyalkylene glycol ether is diglyme.

* * * * *